United States Patent
Vesa et al.

(10) Patent No.: US 10,140,088 B2
(45) Date of Patent: Nov. 27, 2018

(54) VISUAL SPATIAL AUDIO

(71) Applicant: Nokia Technologies Oy, Espoo (FI)

(72) Inventors: Sampo Vesa, Helsinki (FI); Erika Reponen, Tampere (FI); Anssi Rämö, Tampere (FI); Ravi Shenoy, Karnataka (IN); Mikko Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/375,277

(22) PCT Filed: Jan. 28, 2013

(86) PCT No.: PCT/FI2013/050090
§ 371 (c)(1),
(2) Date: Jul. 29, 2014

(87) PCT Pub. No.: WO2013/117806
PCT Pub. Date: Aug. 15, 2013

(65) Prior Publication Data
US 2014/0379108 A1    Dec. 25, 2014

(30) Foreign Application Priority Data
Feb. 7, 2012    (IN) .............................. 450/CHE/2012

(51) Int. Cl.
*G06F 17/00*    (2006.01)
*G06F 3/16*    (2006.01)
(Continued)

(52) U.S. Cl.
CPC .............. *G06F 3/167* (2013.01); *G06F 3/165* (2013.01); *G10H 1/0008* (2013.01);
(Continued)

(58) Field of Classification Search
CPC ........ G10H 2210/301; G10H 2210/131; G06F 3/0487; G06F 3/167; G10L 19/008;
(Continued)

(56) References Cited

U.S. PATENT DOCUMENTS 5,212,733 A * 5/1993 DeVitt ................. G10H 1/0008
381/119
5,812,688 A    9/1998 Gibson
(Continued)

FOREIGN PATENT DOCUMENTS

EP    1657961    5/2006
KR    2007-0088958 A    8/2007
(Continued)

OTHER PUBLICATIONS

Extended European Search Report received for corresponding European Patent Application No. 13746345.1, dated Sep. 14, 2015, 6 pages.
(Continued)

*Primary Examiner* — Andrew C Flanders
(74) *Attorney, Agent, or Firm* — Alston & Bird LLP

(57) ABSTRACT

A method comprising: receiving at least one audio channel signal; receiving at least one user interface input; generating a visualization of the at least one audio channel signal dependent on the at least one user interface input; and rendering the at least one audio channel signal to generate a rendered audio signal dependent on the at least one user interface input wherein the rendered audio channel signal is substantially synchronized with the visualization of the at least one audio channel signal.

24 Claims, 8 Drawing Sheets

(51) Int. Cl.
*G10H 1/00* (2006.01)
*G10H 1/36* (2006.01)
*H04S 7/00* (2006.01)

(52) U.S. Cl.
CPC ............... *G10H 1/368* (2013.01); *H04S 7/40* (2013.01); *G10H 2210/305* (2013.01); *H04S 2400/15* (2013.01); *H04S 2420/01* (2013.01); *H04S 2420/07* (2013.01)

(58) Field of Classification Search
CPC . H04R 3/005; H04S 1/002; H04S 7/40; H04S 2400/15
See application file for complete search history.

(56) References Cited

U.S. PATENT DOCUMENTS

| | | | | |
|---|---|---|---|---|
| 6,490,359 | B1 * | 12/2002 | Gibson | G10H 1/0008 381/119 |
| 6,798,889 | B1 * | 9/2004 | Dicker | H04S 7/301 381/103 |
| 7,698,009 | B2 * | 4/2010 | Cotey | G06F 3/165 381/119 |
| 7,876,914 | B2 | 1/2011 | Grosvenor et al. | |
| 2005/0069143 | A1 | 3/2005 | Budnikov et al. | |
| 2006/0133628 | A1 * | 6/2006 | Trivi | G10H 1/0066 381/310 |
| 2011/0054890 | A1 | 3/2011 | Ketola et al. | |
| 2011/0055703 | A1 * | 3/2011 | Lundback | H04R 27/00 715/727 |
| 2011/0162513 | A1 | 7/2011 | Mizuhiki | |
| 2011/0271186 | A1 | 11/2011 | Owens | |
| 2012/0128174 | A1 | 5/2012 | Tammi et al. | |
| 2013/0132845 | A1 | 5/2013 | Tammi et al. | |
| 2013/0154930 | A1 * | 6/2013 | Xiang | G06F 3/167 345/158 |

FOREIGN PATENT DOCUMENTS

| | | |
|---|---|---|
| KR | 10-0790362 B1 | 1/2008 |
| WO | 2008/025858 A2 | 3/2008 |
| WO | 2010/089357 A2 | 8/2010 |
| WO | 2013/093566 A1 | 6/2013 |

OTHER PUBLICATIONS

"The Psychedelic Screen Saver", Synthesoft, Retrieved on Sep. 25, 2014, Webpage available at : http://www.synthesoft.com/psych/psych.html.

"Spectral Centroid", Wikipedia, Retrieved on Sep. 25, 2014, Webpage available at : http://en.wikipedia.org/wiki/Spectral_centroid.

"Capturing, Visualizing and Recreating Spatial Sound", CCRMA, Retrieved on Sep. 26, 2014, Webpage available at : https://ccrma.stanford.edu/events/capturing-visualizing-and-recreating-spatial-sound-ramani-duraiswami-univ-of-maryland.

International Search Report received for corresponding Patent Cooperation Treaty Application No. PCT/FI2013/050090 , dated Aug. 14, 2013, 4 pages.

International Preliminary Report on Patentability and Written Opinion for corresponding Patent Cooperation Treaty Application No. PCT/FI2013/050090, dated Aug. 12, 2014.

GoPano Store—GoPano micro [online] [retrieved May 2, 2016]. Retrieved from the Internet: <URL: http://web.archive.org/web/20120728115515/http://store.gopano.com/products/gopano-micro#page=technology>. (dated Jul. 28, 2012) 3 pages.

Say hello to Dot! [online] [retrieved May 2, 2016]. Retrieved from the Internet: <URL: http://web.archive.org/web/20140716001143/http://www.kogeto.com/say-hello-to-dot>. (dated Jul. 16, 2014) 1 page.

Office Action for European Application No. 13 746 345.1 dated Mar. 2, 2018, 6 pages.

Bain, M. N., *Real Time Music Visualization: A Study In The Visual Extension Of Music*, A Thesis for The Ohio State University (Jun. 24, 2008), 108 pages.

Misra, A. et al., *SNDTOOLS: Real-Time Audio DSP and 3D Visualization*, International Computer Music Conference Proceedings (Jan. 1, 2005) 4 pages.

Office Action from Indian Patent Application No. 450/CHE/2012, dated Jan. 30, 2018, 7 pages.

* cited by examiner

VISUAL SPATIAL AUDIO

RELATED APPLICATION

This application was originally filed as PCT Application No. PCT/FI2013/050090 filed Jan. 28, 2013, which claims priority benefit from Indian Application No. 450/CHE/2012, filed Feb. 7, 2012.

FIELD

The present application relates to apparatus for the visual representation of spatial audio signals. The application further relates to, but is not limited to, visual representation of spatial audio signals for portable or mobile apparatus.

BACKGROUND

Audio video recording on electronic apparatus is now common. Devices ranging from professional video capture equipment, consumer grade camcorders and digital cameras to mobile phones and even simple devices such as webcams can be used for electronic acquisition of motion video images. Recording video and the audio associated with video has become a standard feature on many mobile devices and the technical quality of such equipment has rapidly improved. Recording personal experiences using a mobile device is quickly becoming an increasingly important use for mobile devices such as mobile phones and other user equipment. Combining this with the emergence of social media and new ways to efficiently share content underlies the importance of these developments and the new opportunities offered for the electronic device industry.

One of the issues is the displaying of the three dimensional audio sound field to the user in a form which is easily processed and manipulated and specifically one which enables the operator of the device to simply control the sound field orientation for processing at a future time.

SUMMARY

Aspects of this application thus provide an audio based user interface display of audio signals which can be used by the user as information permitting control of the orientation of the audio field.

There is provided a method comprising: receiving at least one audio channel signal; receiving at least one user interface input; generating a visualisation of the at least one audio channel signal dependent on the at least one user interface input; and rendering the at least one audio channel signal to generate a rendered audio signal dependent on the at least one user interface input wherein the rendered audio channel signal is substantially synchronised with the visualisation of the at least one audio channel signal.

Receiving at least one audio channel signal may comprise at least one of: receiving the at least one audio channel signal from at least one microphone; receiving the at least one audio channel signal from a memory; and receiving the at least one audio channel signal from at least one external apparatus.

Receiving at least one user interface input may comprise at least one of: receiving at least one user input from a touch screen; determining an action associated with the at least one user input; and outputting an indicator representing the action.

Generating a visualisation of the at least one audio channel signal dependent on the at least one user interface input may comprise: receiving the indicator representing the action; and modifying the visualization of the at least one audio channel signal dependent on the indicator.

Rendering the at least one audio channel signal to generate a rendered audio signal may comprise: receiving the indicator representing the action; and modifying the rendered audio signal dependent on the indicator to follow the visualization of the at least one audio channel signal.

The action associated with the at least one user input may comprise at least one of: a clockwise rotation; a counterclockwise rotation; a translational motion; a rotation about an external point; a focus on a determined position; and a tilt.

Generating a visualisation of the at least one audio channel signal dependent on the at least one user interface input may comprise: determining at least one directional component for the at least one audio channel signal; and determining a radial value for a visualization sector dependent on the frequency of directional components of the at least one audio signal in the sector range.

Determining at least one directional component for the at least one audio channel signal may comprise: grouping time domain samples of the at least one audio channel signal into frames; time to frequency domain converting the frames of the at least one audio channel signal; dividing the frequency domain representation of the at least one audio channel signal into at least two sub-bands; and comparing pairs of audio channel signal sub-bands to determine at least one directional component.

Generating a visualisation of the at least one audio channel signal dependent on the at least one user interface input may comprise: determining at least one magnitude component for the at least one directional component for the at least one audio channel signal; and determining a colour value for a visualization sector dependent on the magnitude component for the at least one directional component for the at least one audio channel signal.

Rendering the at least one audio channel signal to generate a rendered audio signal dependent on the at least one user interface input may comprise: generating a head related transfer function; and applying the head related transfer function to the at least one audio channel signal.

An apparatus comprising at least one processor and at least one memory including computer code for one or more programs, the at least one memory and the computer code configured to with the at least one processor cause the apparatus to at least perform: receiving at least one audio channel signal; receiving at least one user interface input; generating a visualisation of the at least one audio channel signal dependent on the at least one user interface input; and rendering the at least one audio channel signal to generate a rendered audio signal dependent on the at least one user interface input wherein the rendered audio channel signal is substantially synchronised with the visualisation of the at least one audio channel signal.

Receiving at least one audio channel signal may cause the apparatus to perform at least one of: receiving the at least one audio channel signal from at least one microphone; receiving the at least one audio channel signal from a memory; and receiving the at least one audio channel signal from at least one external apparatus.

Receiving at least one user interface input may cause the apparatus to perform at least one of: receiving at least one user input from a touch screen; determining an action associated with the at least one user input; and outputting an indicator representing the action.

Generating a visualisation of the at least one audio channel signal dependent on the at least one user interface input may cause the apparatus to perform: receiving the indicator representing the action; and modifying the visualization of the at least one audio channel signal dependent on the indicator.

Rendering the at least one audio channel signal to generate a rendered audio signal may cause the apparatus to perform: receiving the indicator representing the action; and modifying the rendered audio signal dependent on the indicator to follow the visualization of the at least one audio channel signal.

The action associated with the at least one user input may comprise at least one of: a clockwise rotation; a counter-clockwise rotation; a translational motion; a rotation about an external point; a focus on a determined position; and a tilt.

Generating a visualisation of the at least one audio channel signal dependent on the at least one user interface input may cause the apparatus to perform: determining at least one directional component for the at least one audio channel signal; and determining a radial value for a visualization sector dependent on the frequency of directional components of the at least one audio signal in the sector range.

Determining at least one directional component for the at least one audio channel signal may cause the apparatus to perform: grouping time domain samples of the at least one audio channel signal into frames; time to frequency domain converting the frames of the at least one audio channel signal; dividing the frequency domain representation of the at least one audio channel signal into at least two sub-bands; and comparing pairs of audio channel signal sub-bands to determine at least one directional component.

Generating a visualisation of the at least one audio channel signal dependent on the at least one user interface input may cause the apparatus to perform: determining at least one magnitude component for the at least one directional component for the at least one audio channel signal; and determining a colour value for a visualization sector dependent on the magnitude component for the at least one directional component for the at least one audio channel signal.

Rendering the at least one audio channel signal to generate a rendered audio signal dependent on the at least one user interface input may cause the apparatus to perform: generating a head related transfer function; and applying the head related transfer function to the at least one audio channel signal.

According to a third aspect there is provided an apparatus comprising: an audio input configured to receive at least one audio channel signal; a touch input configured to receive at least one user interface input; spatial audio visualizer configured to generate a visualisation of the at least one audio channel signal dependent on the at least one user interface input; and an audio renderer configured to render the at least one audio channel signal to generate a rendered audio signal dependent on the at least one user interface input wherein the rendered audio channel signal is substantially synchronised with the visualisation of the at least one audio channel signal.

The audio input may comprise at least one of: at least one audio channel signal from at least one microphone; at least one audio channel signal from a memory; and a receiver configured to receive at least one audio channel signal from at least one external apparatus.

The touch input may comprise: a touch screen; a touch screen input determiner configured to determine an action associated with the user screen; and an indicator determiner configured output an indicator representing the action.

The spatial audio visualizer may comprise: an input configured to receive the indicator representing the action; and a visualization modifier configured to modify the visualization of the at least one audio channel signal dependent on the indicator.

The audio renderer may comprise: an input configured to receive the indicator representing the action; and audio modifier configured to modify the rendered audio signal dependent on the indicator to follow the visualization of the at least one audio channel signal.

The action associated with the at least one user input may comprise at least one of: a clockwise rotation; a counter-clockwise rotation; a translational motion; a rotation about an external point; a focus on a determined position; and a tilt.

The spatial audio visualizer may comprise: a directional component determiner configured to determine at least one directional component for the at least one audio channel signal; and a radial value determiner configured to determine a radial value for a visualization sector dependent on the frequency of directional components of the at least one audio signal in the sector range.

The directional component determiner may comprise: a framer configured to group time domain samples of the at least one audio channel signal into frames; a time to frequency domain converter configured to time to frequency domain convert the frames of the at least one audio channel signal; a sub-band filter configured to divide the frequency domain representation of the at least one audio channel signal into at least two sub-bands; and a comparator configured to compare pairs of audio channel signal sub-bands to determine at least one directional component.

The spatial audio visualizer may comprise: a magnitude value determiner configured to determine at least one magnitude component for the at least one directional component for the at least one audio channel signal; and a colour value determiner configured to determine a colour value for a visualization sector dependent on the magnitude component for the at least one directional component for the at least one audio channel signal.

The audio renderer may comprise: a head related transfer function generator configured to generate a head related transfer function; and to process the head related transfer function to the at least one audio channel signal.

According to a fourth aspect there is provided an apparatus comprising: means for receiving at least one audio channel signal; means for receiving at least one user interface input; generating a visualisation of the at least one audio channel signal dependent on the at least one user interface input; and means for rendering the at least one audio channel signal to generate a rendered audio signal dependent on the at least one user interface input wherein the rendered audio channel signal is substantially synchronised with the visualisation of the at least one audio channel signal.

The means for receiving at least one audio channel signal may comprise at least one of: means for receiving the at least one audio channel signal from at least one microphone; means for receiving the at least one audio channel signal from a memory; and means for receiving the at least one audio channel signal from at least one external apparatus.

The means for receiving at least one user interface input may comprise at least one of: means for receiving at least one user input from a touch screen; means for determining an action associated with the at least one user input; and means for outputting an indicator representing the action.

The means for generating a visualisation of the at least one audio channel signal dependent on the at least one user interface input may comprise: means for receiving the indicator representing the action; and modifying the visualization of the at least one audio channel signal dependent on the indicator.

The means for rendering the at least one audio channel signal to generate a rendered audio signal may comprise: means for receiving the indicator representing the action; and means for modifying the rendered audio signal dependent on the indicator to follow the visualization of the at least one audio channel signal.

The action associated with the at least one user input may comprise at least one of: a clockwise rotation; a counter-clockwise rotation; a translational motion; a rotation about an external point; a focus on a determined position; and a tilt.

The means for generating a visualisation of the at least one audio channel signal dependent on the at least one user interface input may comprise: means for determining at least one directional component for the at least one audio channel signal; and means for determining a radial value for a visualization sector dependent on the frequency of directional components of the at least one audio signal in the sector range.

The means for determining at least one directional component for the at least one audio channel signal may comprise: means for grouping time domain samples of the at least one audio channel signal into frames; means for time to frequency domain converting the frames of the at least one audio channel signal; means for dividing the frequency domain representation of the at least one audio channel signal into at least two sub-bands; and means for comparing pairs of audio channel signal sub-bands to determine at least one directional component.

The means for generating a visualisation of the at least one audio channel signal dependent on the at least one user interface input may comprise: means for determining at least one magnitude component for the at least one directional component for the at least one audio channel signal; and means for determining a colour value for a visualization sector dependent on the magnitude component for the at least one directional component for the at least one audio channel signal.

The means for rendering the at least one audio channel signal to generate a rendered audio signal dependent on the at least one user interface input may comprise: means for generating a head related transfer function; and means for applying the head related transfer function to the at least one audio channel signal.

A computer program product stored on a medium may cause an apparatus to perform the method as described herein.

An electronic device may comprise apparatus as described herein.

A chipset may comprise apparatus as described herein.

A method for audio user interface input may be substantially as herein described and illustrated in the accompanying drawings.

An apparatus for audio user interface input may be substantially as herein described and illustrated in the accompanying drawings.

Embodiments of the present application aim to address problems associated with the state of the art.

SUMMARY OF THE FIGURES

For better understanding of the present application, reference will now be made by way of example to the accompanying drawings in which.

EMBODIMENTS OF THE APPLICATION

The following describes in further detail suitable apparatus and possible mechanisms for the provision of effective spatial audio signal visualization.

The concept of the application is related to analysing and visualizing spatial audio signals. The display of such visualizations can allow the operator or user of apparatus displaying the visualization to selectively process the audio signal to be output to the user, for example by selectively filtering the audio signals from a direction or range of directions.

Figure 1:
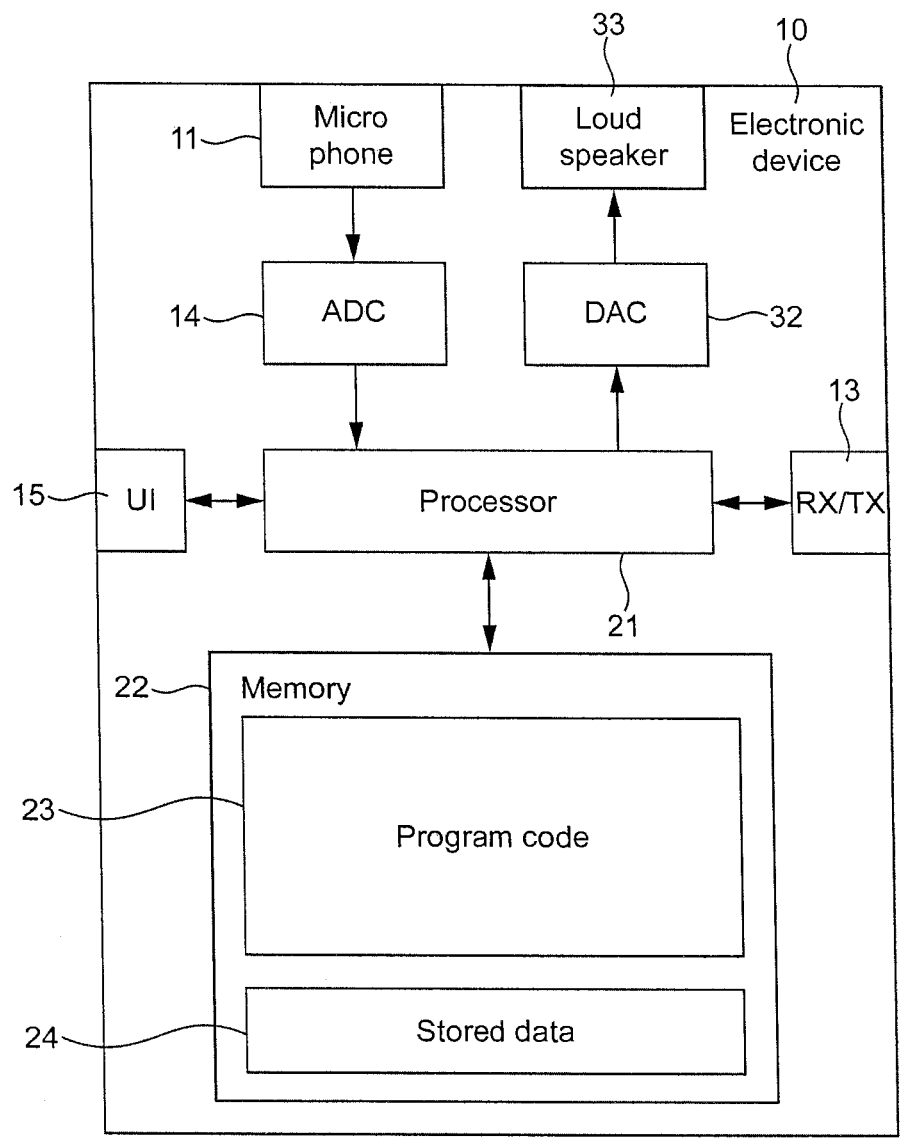
FIG. 1 shows a schematic view of an apparatus suitable for implementing embodiments.

In this regard reference is first made to FIG. 1 which shows a schematic block diagram of an exemplary apparatus or electronic device 10, which may be used to capture or monitor the audio signals, to determine audio source directions/motion and determine whether the audio source motion matches known or determined gestures for user interface purposes.

The apparatus 10 can for example be a mobile terminal or user equipment of a wireless communication system. In some embodiments the apparatus can be an audio player or audio recorder, such as an MP3 player, a media recorder/player (also known as an MP4 player), or any suitable portable device requiring user interface inputs.

In some embodiments the apparatus can be part of a personal computer system enabling hands-free user interface input, for example in an electronic document reader, a tablet computer, a laptop. In some embodiments the apparatus comprises adapted electronic equipment for users with limb injury or with missing limbs.

The apparatus 10 can in some embodiments comprise an audio subsystem. The audio subsystem for example can include in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, electret condenser microphone, dynamic microphone, ribbon microphone, carbon microphone, piezoelectric microphone, or microelectrical-mechanical system (MEMS) microphone. The microphone 11 or array of microphones can in some embodiments output the audio captured signal to an analogue-to-digital converter (ADC) 14.

In some embodiments the apparatus and audio subsystem includes an analogue-to-digital converter (ADC) 14 configured to receive the analogue captured audio signal from the microphones and output the audio captured signal in a suitable digital form. The analogue-to-digital converter 14 can be any suitable analogue-to-digital conversion or processing means.

In some embodiments the apparatus 10 and audio subsystem further includes a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can include in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise the audio capture only such that in some embodiments of the apparatus the microphone (for audio capture) and the analogue-to-digital converter are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals.

The processor 21 can be configured to execute various program codes. The implemented program codes can comprise for example source determination, audio source direction estimation, and audio source motion to user interface gesture mapping code routines.

In some embodiments the apparatus further comprises a memory 22. In some embodiments the processor 21 is coupled to memory 22. The memory 22 can be any suitable storage means. In some embodiments the memory 22 comprises a program code section 23 for storing program codes implementable upon the processor 21 such as those code routines described herein. Furthermore in some embodiments the memory 22 can further comprise a stored data section 24 for storing data, for example audio data that has been captured in accordance with the application or audio data to be processed with respect to the embodiments described herein. The implemented program code stored within the program code section 23, and the data stored within the stored data section 24 can be retrieved by the processor 21 whenever needed via a memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

It is to be understood again that the structure of the electronic device 10 could be supplemented and varied in many ways.

Figure 2:
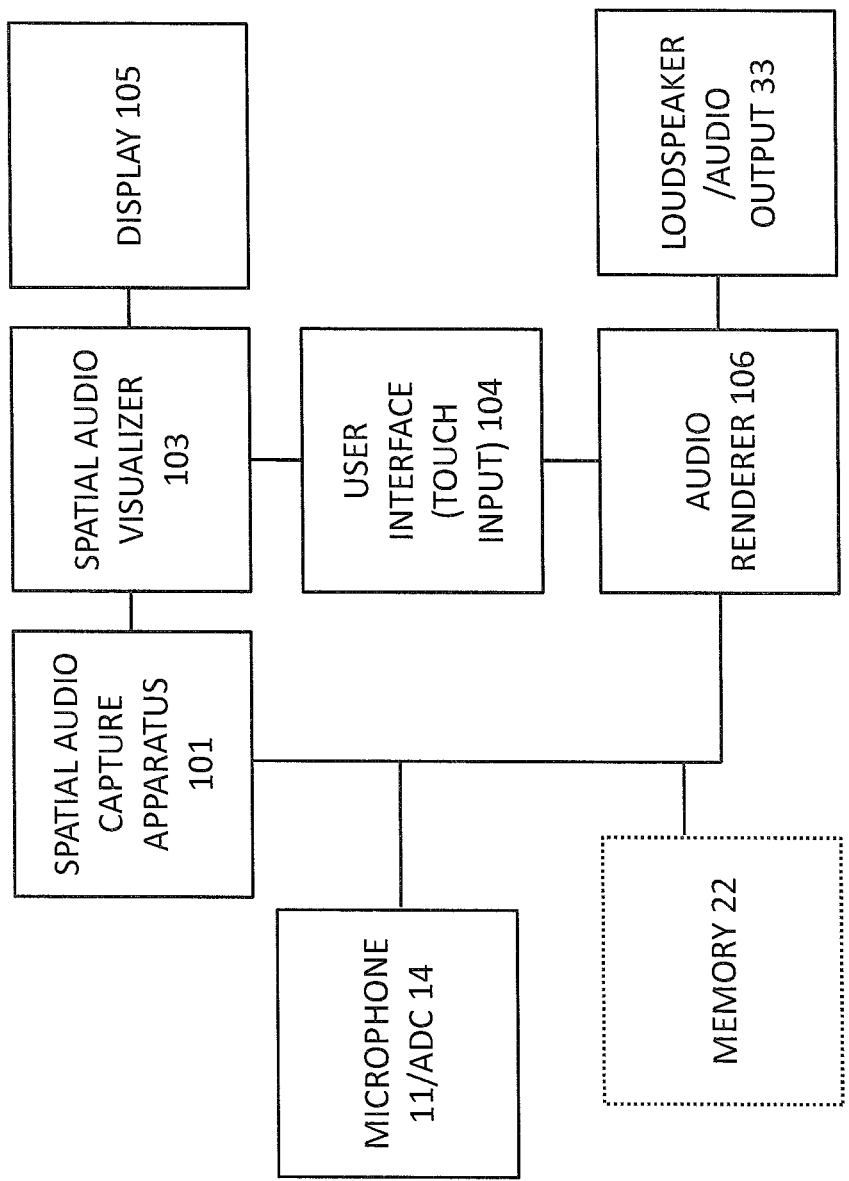
FIG. 2 shows schematically apparatus suitable for implementing embodiments in further detail.

With respect to FIG. 2 the audio source user interface apparatus concept according to some embodiments is shown. Furthermore with respect to FIG. 3 the operation of the apparatus is described.

The apparatus can as described herein comprise a microphone array including at least two microphones or audio signal generating or capturing means and an associated analogue-to-digital converter suitable for converting the signals from the microphone array at least two microphones into a suitable digital format for further processing. The microphones can be, for example, be located on the apparatus at ends of the apparatus and separated by a distance d. The acoustic signals can therefore be considered to be captured by the microphone and passed by suitable means as an audio signal to a spatial audio capture apparatus 101.

For example a microphone array arrangement could be one where a first microphone and a second microphone are separated by a dimension or distance d from each other. The separation between each microphone is such that the audio signal received from a signal source will arrive at a first microphone, for example, earlier than the other microphone.

In the following examples the microphone array pair as described above are described. It would be understood however that the following microphone array pair examples can be easily scaled up to arrays of microphones with more than two microphones which can in some embodiments include pairs with perpendicular axis to each other to monitor not only an azimuth or elevation but azimuth and elevation, or distinguish between forward and rear audio sources.

Figure 3:
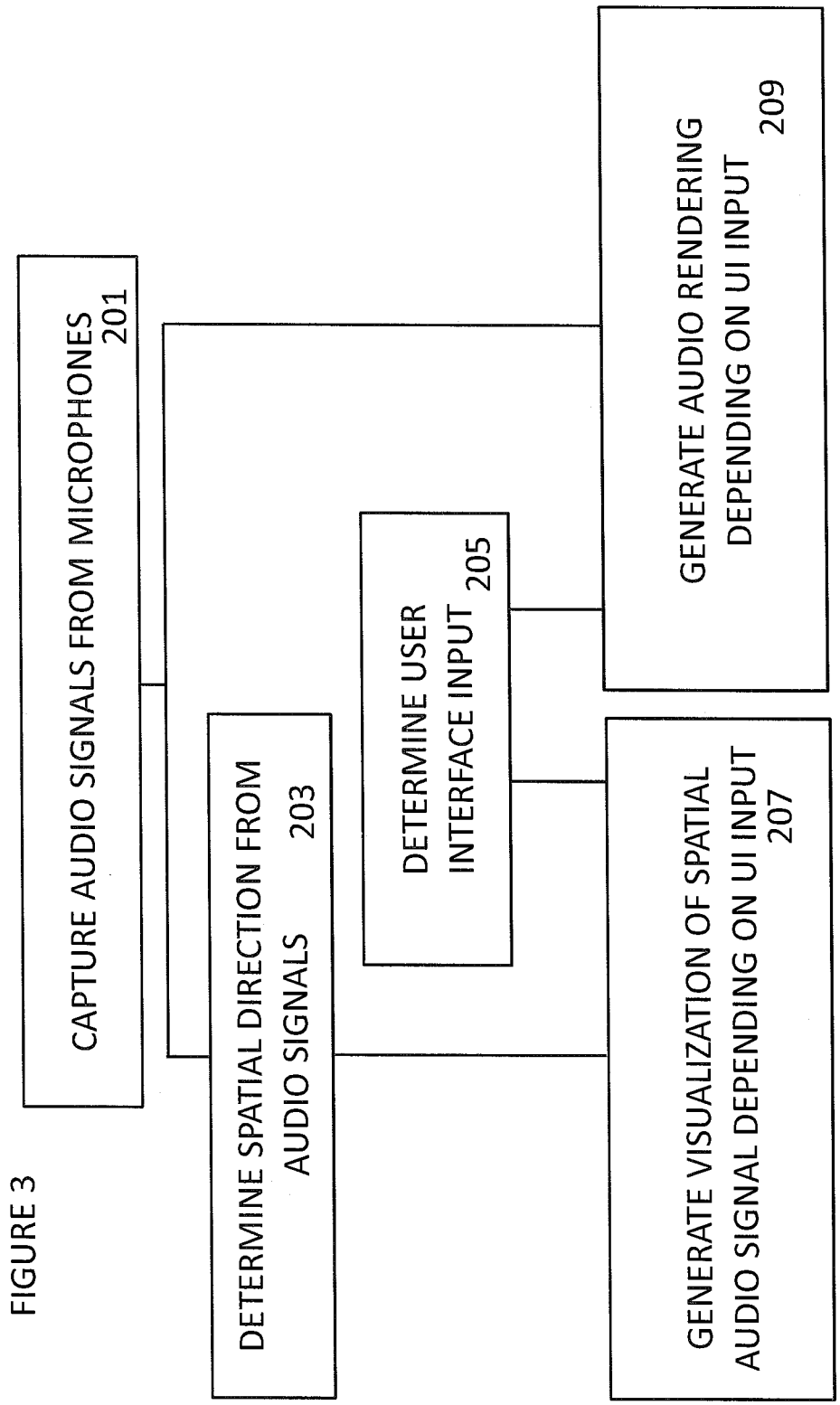
FIG. 3 shows the operation of the apparatus shown in FIG. 2 according to some embodiments.

The operation of capturing audio signals from the microphones is shown in FIG. 3 by step 201.

The audio signals in some embodiments are similarly passed to an audio renderer 106 or audio rendering means. In some embodiments the audio signals can be passed to a memory 22 (shown in FIG. 2 as a dotted box) and be stored at least temporarily in the memory before processing such as audio rendering and spatial audio capture (directional analysis) and visualization is performed.

In some embodiments the apparatus comprises a spatial audio capture apparatus 101. The spatial audio capture apparatus 101 or suitable means can be configured to receive the audio signals from the microphones and perform spatial analysis on these to determine a direction relative to the apparatus of the audio source. The audio source spatial analysis results can then be passed to the spatial audio visualizer 103.

The operation of determining the spatial direction from audio signals is shown in FIG. 3 in step 203.

Figure 4:
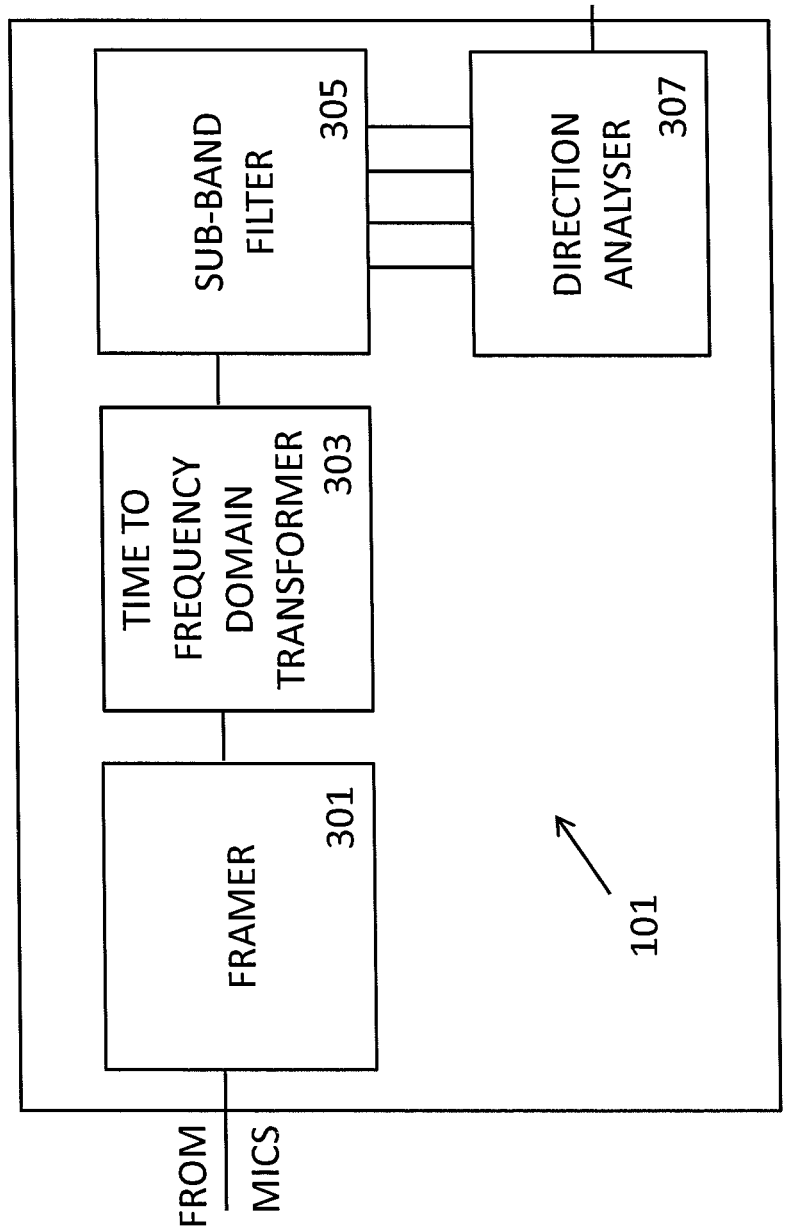
FIG. 4 shows schematically the spatial audio capture apparatus as shown in FIG. 2 in further detail.

With respect to FIG. 4 the spatial audio capture apparatus 101 is shown in further detail. Furthermore with respect to FIG. 5 the operation of the spatial audio capture apparatus 101 shown in FIG. 4 is further described.

In some embodiments the spatial audio capture apparatus 101 comprises a framer 301. The framer 301 or suitable framer means can be configured to receive the audio signals from the microphones and divide the digital format signals into frames or groups of audio sample data. In some embodiments the framer 301 can furthermore be configured to window the data using any suitable windowing function. The framer 301 can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer 301 can be configured to output the frame audio data to a Time-to-Frequency Domain Transformer 303.

Figure 5:
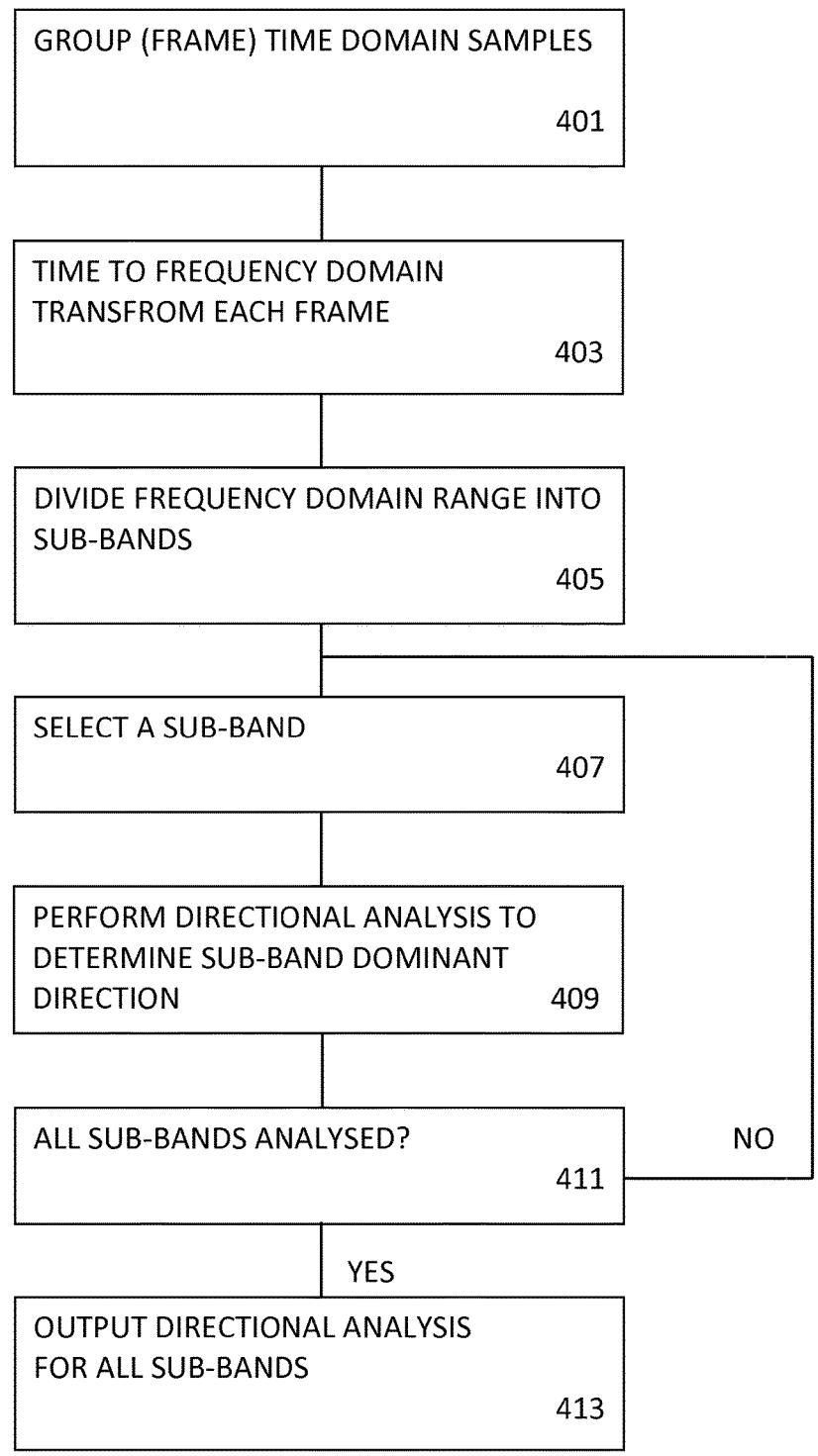
FIG. 5 shows a flow diagram of the operation of the spatial audio capture apparatus according to some embodiments.

The operation of grouping or framing time domain samples is shown in FIG. 5 by step 401.

In some embodiments the spatial audio capture apparatus 101 is configured to comprise a Time-to-Frequency Domain Transformer 303. The Time-to-Frequency Domain Transformer 303 or suitable transformer means can be configured to perform any suitable time-to-frequency domain transformation on the frame audio data. In some embodiments the Time-to-Frequency Domain Transformer can be a Discrete Fourier Transformer (DTF). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer 303 can be configured to output a frequency domain signal for each microphone input to a sub-band filter 305.

The operation of transforming each signal from the microphones into a frequency domain, which can include framing the audio data, is shown in FIG. 5 by step 403.

In some embodiments the spatial audio capture apparatus 101 comprises a sub-band filter 305. The sub-band filter 305 or suitable means can be configured to receive the frequency domain signals from the Time-to-Frequency Domain Transformer 303 for each microphone and divide each microphone audio signal frequency domain signal into a number of sub-bands.

The sub-band division can be any suitable sub-band division. For example in some embodiments the sub-band filter 305 can be configured to operate using psychoacoustic filtering bands. The sub-band filter 305 can then be configured to output each domain range sub-band to a direction analyser 307.

The operation of dividing the frequency domain range into a number of sub-bands for each audio signal is shown in FIG. 5 by step 405.

In some embodiments the spatial audio capture apparatus 101 can comprise a direction analyser 307. The direction analyser 307 or suitable means can in some embodiments be configured to select a sub-band and the associated frequency domain signals for each microphone of the sub-band.

The operation of selecting a sub-band is shown in FIG. 5 by step 407.

The direction analyser 307 can then be configured to perform directional analysis on the signals in the sub-band. The directional analyser 307 can be configured in some embodiments to perform a cross correlation between the microphone pair sub-band frequency domain signals within a suitable processing means.

In the direction analyser 307 the delay value of the cross correlation is found which maximises the cross correlation of the frequency domain sub-band signals. This delay can in some embodiments be used to estimate the angle or represent the angle from the dominant audio signal source for the sub-band. This angle can be defined as a. It would be understood that whilst a pair or two microphones can provide a first angle, an improved directional estimate can be produced by using more than two microphones and preferably in some embodiments more than two microphones on two or more axes.

The operation of performing a directional analysis on the signals in the sub-band is shown in FIG. 5 by step 409.

The directional analyser 307 can then be configured to determine whether or not all of the sub-bands have been selected.

The operation of determining whether all the sub-bands have been selected is shown in FIG. 5 by step 411.

Where all of the sub-bands have been selected in some embodiments then the direction analyser 307 can be configured to output the directional analysis results to the spatial audio visualizer 103.

The operation of outputting the directional analysis results to the spatial audio visualizer 103 is shown in FIG. 5 by step 413.

Where not all of the sub-bands have been selected then the operation can be passed back to selecting a further sub-band processing step.

The above describes a direction analyser performing an analysis using frequency domain correlation values. However it would be understood that the spatial audio capture apparatus can perform directional analysis using any suitable method. For example in some embodiments the spatial audio capture apparatus can be configured to output specific azimuth-elevation values rather than maximum correlation delay values. Furthermore in some embodiments the spatial analysis can be performed in the time domain.

In some embodiments the apparatus comprises an audio renderer 106 or audio rendering means. The audio renderer 106 in some embodiments can be configured to receive the audio signals from the microphone and process the audio signals to be output to a suitable audio output. In some embodiments the audio output can be the apparatus loudspeakers 33 such as shown in the following examples. However the audio output can be any suitable audio output such as for example headphones, headset, earpiece set, audio display, or any suitable arrangement of loudspeakers.

In some embodiments the audio renderer 106 is configured to output multichannel audio signals, for example to stereo (2 channel) headphones or a multi-channel loudspeaker system (such as a 5.1, 7.1 or 9.1 loudspeaker audio system). In such embodiments the audio renderer 106 is configured to receive the microphone or stored audio signals and mix the audio signals to generate suitable multichannel audio output signals. It would be understood that the audio renderer 106 is configured to mix the audio signals dependent on the arrangement or location of the output audio means and the associated input audio signal arrangement.

The audio renderer 106 in some embodiments is configured to receive an input from the user interface 104 and control the mixing of the audio signals dependent on the user interface input 104. The same user interface 104 signal passed to the spatial visualizer 103 can in some embodiments be passed to the audio renderer 106, and configured to modify the audio signals generated by the audio renderer 106. For example as is discussed herein the user interface input 104 can be configured to generate a 'rotate clockwise' indicator which can be passed to the spatial visualizer 103 and to the audio renderer 106. The 'rotate clockwise' indicator can in some embodiment be configured to control the mixing of the audio signals so that the audio renderer 106 can rotate the mixed audio signal output such that the audio signal 'appears' to be similarly rotating in step or synchronized with the rotation of the visualization as discussed herein. In some embodiments this can be achieve by modifying a head related transfer function (HRTF) or similar spatial filtering coefficients.

In some embodiments the apparatus comprises a spatial audio visualizer 103 or audio signal spatial visualization means. The spatial audio visualizer 103 is configured to receive the directional analysis values over a series of frames and produce a visualization of the analysis values suitable for displaying. The spatial audio visualizer 103 can furthermore in some embodiments receive an input from the user interface and in particular a touch input user interface and be configured to orientate or change the visualization of the audio sound field dependent on the user interface input.

Figure 6:
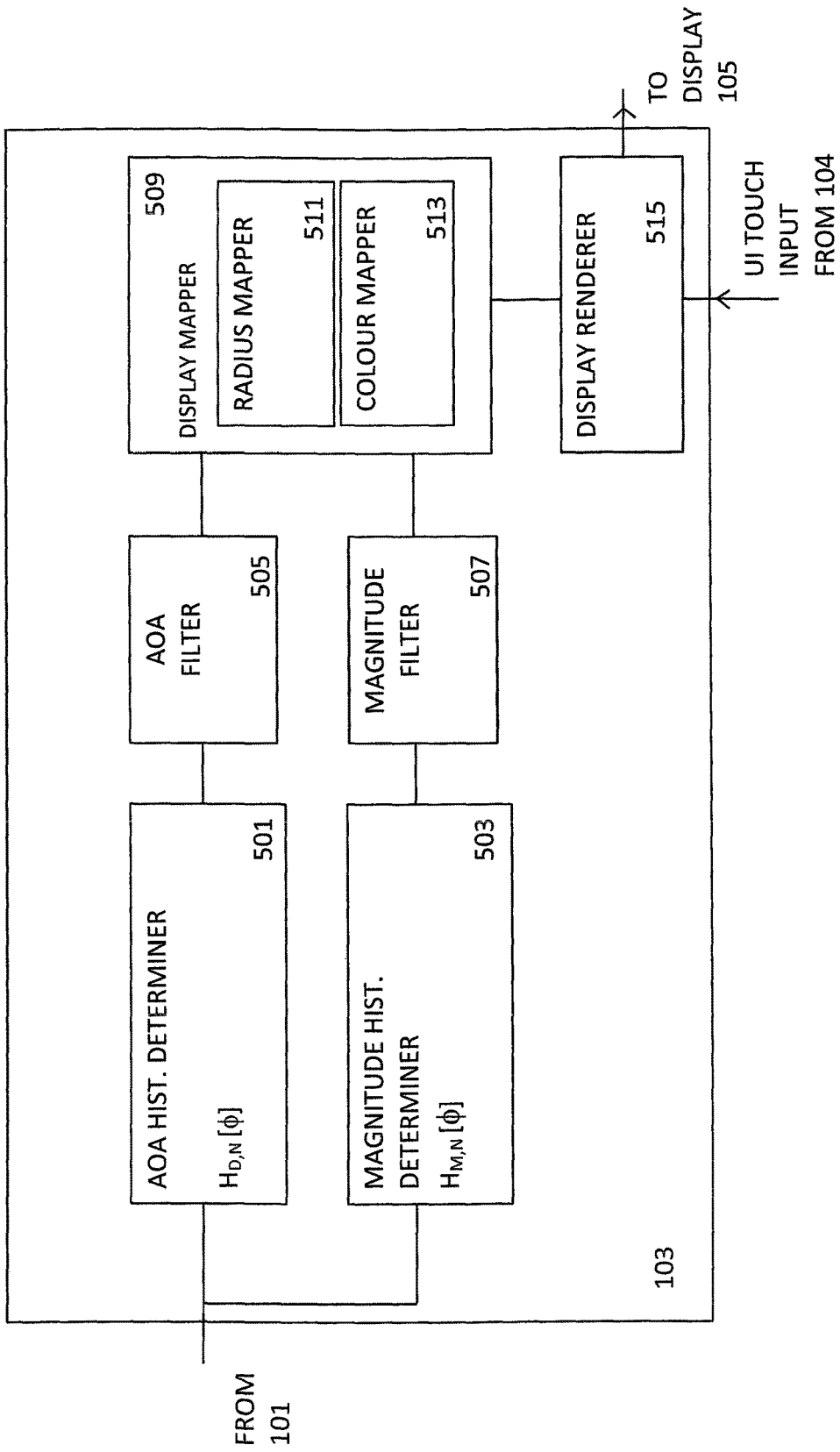
FIG. 6 shows schematically the spatial audio visualizer as shown in FIG. 2 in further detail.

With regards to FIG. 6 the spatial audio visualizer 103 is shown in further detail. Furthermore with respect to FIG. 7 the operation of the spatial audio visualizer 103 according to some embodiments is shown.

The spatial audio visualizer can be configured to map the directional sound field analysis results such as the direction and magnitude at each time frequency. In some embodiments as described herein the visualization of the audio signal directional analysis can be a circular sectorized visualization of the spatially captured audio content. However it would be understood that other types and kinds of visualizations can also be generated. In some embodiments the visualization can be based on the live, real-time sound field surrounding the operator or apparatus. The visualization in some embodiments can be based on the analysis of any suitable audio signals, for example previously recorded audio content. Furthermore as audio signals can be part of captured audio-video signals, in some embodiments the visualization can be displayed as an overlay or layer of the video playback. In some embodiments the visualization overlay over the video images can be configured to switch between operational modes. For example one mode can be where only the audio visualization is shown, the video is shown, or the visualization is an overlay.

Furthermore in some embodiments the spatial audio visualizer can be configured to receive a suitable user interface or touch or other input and for example based on a swipe and tapping gesture on the user interface to rotate the sound field as disussed above and similarly rotate the visualization of the sound field.

In some embodiments the spatial audio visualizer 107 comprises an angle of arrival histogram determiner 501. The angle of arrival histogram determiner 501 can be configured to receive the results from the spatial audio capture apparatus 101, in other words the determination of the directional analysis for each sub-band. An angle of arrival histogram $H_{D,n}[\varphi]$ for the directional results of each time-frequency tile $D_{k,n}$ where k is the frequency band index and n is the frame index for the current time index can be determined by counting the number of frequency bands that have the angle $\varphi$ as the assigned direction and normalise by the total number of frequency bands (in order that the histogram sums to 1). In some embodiments the angle of arrival histogram can be determined for ranges of directional angles. For example in some embodiments the histogram is determined for directional bins of 10° such that there are 36 histogram bins. In such embodiments a first bin for the angle of arrival of 0° would be rendered as a sector from −5° to +5°, the second bin with an angle of arrival of 10° as the sector from +5° to +15° and so on. In some embodiments the histogram bin distribution can be non-linear or linear (similarly the range or sizes of each bin can be constant or vary from bin to bin). For example in some embodiments the histogram can be determined such that it has a 'finer' sectorization of the spatial audio field directly in front of the apparatus. In other words the bin size is smaller directly in front of the apparatus where for example a video camera may be situated. Furthermore in some embodiments the histogram can be configured to have a 'coarser' sectorization for regions away from the 'front' of the apparatus, for example for audio signals which are determined to originate outside of the apparatus camera view field.

The angle of arrival histogram determiner 501 can be further configured to output the angle of arrival histogram $H_{D,n}[\varphi]$ to the angle of arrival filter 505.

Figure 7:
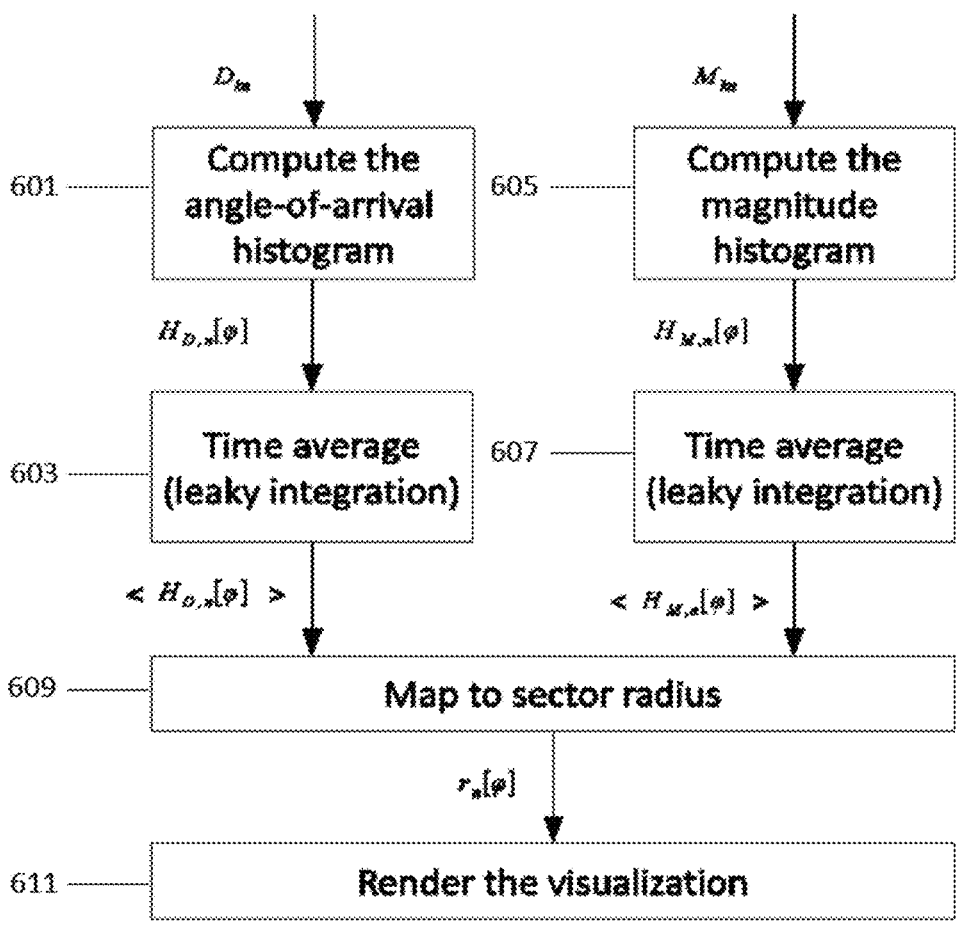
FIG. 7 shows a flow diagram of the operation of the spatial audio visualizer according to some embodiments.

The operation of computing the angle of arrival histogram is shown in FIG. 7 by step 601.

In some embodiments the spatial audio visualizer 103 comprises an angle of arrival filter 505. The angle of arrival filter 505 is configured to receive the angle of arrival histogram and perform a time average filtering of the angle of arrival histogram to smooth any changes from frame to frame. In some embodiments the angle of arrival filter 505 can be implemented as a leaky integrator and can be mathematically summarised as follows:

$$\langle H_{D,n}[\varphi]\rangle = \beta \cdot \langle H_{D,n-1}[\varphi]\rangle + (1-\beta)\cdot H_{D,n}[\varphi],$$

where $\beta$ is the forgetting factor and $\langle\ \rangle$ denotes a time-averaged quantity.

The time averaged angle of arrival histogram can then in some embodiments be output to a display mapper 509.

In some embodiments the spatial audio visualizer 103 comprises a magnitude histogram determiner 503. The magnitude histogram determiner 503 can be configured to receive from the spatial audio capture apparatus directional (and other) information regarding the audio signals, such as the generated audio signals from the microphone and determine a histogram based on the magnitude of the audio signals.

In some embodiments the magnitude histogram determiner 503 is configured to determine the magnitude histogram $H_{M,n}[\varphi]$ by determining the frequency bands k at which $D_{k,n}=\varphi$ and then summing the corresponding values of $M_{k,n}$, the magnitude of each time-frequency tile where k is the frequency band index and n is the frame index.

The summing of the corresponding values of $M_{k,n}$ therefore in some embodiments yields a magnitude histogram $H_{M,n}[\varphi]$. In some embodiments the value of the magnitude histogram can be normalised by a reference magnitude for plotting purposes.

In some embodiments the magnitude histogram can be determined for ranges of directional angles. For example in some embodiments the histogram is determined for directional bins of 10° such that there are 36 histogram bins. In such embodiments a first bin for the angle of arrival of 0° would be rendered as a sector from −5° to +5°, the second bin with an angle of arrival of 10° as the sector from +5° to +15° and so on. In some embodiments the histogram bin distribution can be non-linear or linear (similarly the range or sizes of each bin can be constant or vary from bin to bin). For example in some embodiments the histogram can be determined such that it has a 'finer' sectorization of the spatial audio field directly in front of the apparatus. In other words the bin size is smaller directly in front of the apparatus where for example a video camera may be situated. Furthermore in some embodiments the histogram can be configured to have a 'coarser' sectorization for regions away from the 'front' of the apparatus, for example for audio signals which are determined to originate outside of the apparatus camera view field.

In some embodiments the background noise level can also be estimated and used to scale the magnitudes. In such embodiments the visualization output would effectively be immune from microphone input level changes as the sector visualization values would be scaled with respect to any varying input signal.

In some embodiments the magnitude histogram is converted to a logarithmic scale. The conversion to logarithmic scale, in other words converting the values to decibels, enables such visualization embodiments to represent the human perception of sound.

The magnitude histogram determiner 503 can be configured to output the magnitude histogram value to a magnitude histogram filter 507.

The operation of computing the magnitude histogram is shown in FIG. 7 by step 605.

In some embodiments the spatial audio visualizer 103 comprises a magnitude filter 507 configured to receive the magnitude histogram values from the magnitude histogram determiner 503 and perform a time averaging filtering of the magnitude histogram values.

In some embodiments the magnitude filter 507 can be represented by a leaky integrator such as described mathematically as:

$$\langle H_{M,n}[\varphi]\rangle = \beta \cdot \langle H_{M,n-1}[\varphi]\rangle + (1-\beta)\cdot H_{M,n}[\varphi],$$

where $\beta$ is the forgetting factor and $\langle\ \rangle$ denotes a time-averaged quantity.

The output of the magnitude filter 507 can be passed to the display mapper 509.

The operation of time averaging the magnitude histogram is shown in FIG. 7 by step 607.

In some embodiments the time averaging filtering as shown by the angle of arrival filter and magnitude filter as implemented as leaky integrator filters can employ a value of $\beta$ somewhere between 0.9 and 0.95.

Furthermore in some embodiments the sectors can be equivalent to the sectors used in the angle of arrival histogram.

In some embodiments the spatial audio visualizer 103 comprises a display mapper 509. The display mapper can be configured to receive the histogram information such as the angle of arrival histogram information from the angle of arrival filter 505 and/or the magnitude filter 507 outputting the magnitude histogram values. In some embodiments the display mapper 509 can comprise a radius mapper 511. The radius mapper 511 can be configured to receive the histogram information and generate a sectorized radius dependent on the histogram value. In some embodiments the radius is determined according to the following expression:

$$r_n[\varphi]=R\cdot(B\cdot\langle H_{D,n}[\varphi]\rangle + (1-B)\cdot H_{M,n}[\varphi]\rangle),$$

where R is the maximum radius, which in some embodiments is defined as part of the user interface layout and B determines a blending between the histograms.

In some embodiments the mapping from the time averaged angle of arrival filter and magnitude filter histogram values and the determined sector radius is non-linear. Furthermore although as described herein the determined sector radius is generated algorithmically according to a mathematical expression it would be understood that in some embodiments the determined sector radius values can be obtained by any suitable means, for example via a look-up table.

Furthermore although in the examples discussed herein the scope or range of the determined histogram and therefore the visualization is a full 360 degree field in some embodiments the visualization can be limited to a field less than 360°. For example in embodiments where there are two microphones directed forward the audio signals generated by the microphones can be used to generate a 180 degree field 'forward' audio analysis, in some embodiments the visualization of the captured audio signals is determined dependent on the visual field of view defined by the apparatus camera.

In some embodiments the value of the variable 'a' determining the mix between the time averaged angle of arrival histogram and magnitude histogram values can in some embodiments be defined by the user, be semi-automatically defined, or automatically determined.

The operation of mapping the histogram to the sector radius is shown in FIG. 7 by step 609.

In some embodiments the display mapper 509 comprises a colour mapper 513. The colour mapper 513 can be configured to generate for each defined sector a colour value dependent on at least one of the time averaged histogram values for the sector in question.

In other words in some embodiments the colour of each sector can be chosen such that the 'slowed down' (or time averaged) histogram values of the directional histogram and/or magnitude histogram are mapped directly to the colour. In some embodiments the colour can be chosen based on the total magnitude of sound coming from the direction $\varphi$ or can be a linear or non-linear combination of both.

In some embodiments the sector colour can be chosen or picked from a pre-defined colour map fitting the current profile in the device. In some embodiments the order of colours can be chosen such that a stronger sound corresponds to a brighter colour and a weaker sound to a darker one. In some embodiments the colour mapper can determine a colour based on any suitable parameter of the audio sound for the sector such as frequency content, frequency median value or other frequency dependent value such that the spectral centroid of the parts of the sound coming from a specific direction are determined and the colour of the corresponding sector based on the centroid value. In such embodiments a low centroid (in other words a low frequency content sound) generates a darker colour and a high centroid (or strong high frequency content) generates a lighter colour. However any suitable mapping can be implemented.

In some embodiments the apparatus comprises a user interface touch input component. The "touch input" however can in some embodiments be any suitable input other than those described herein. For example in some embodiments the touch input can be a "hover touch" input wherein the user does not actually touch physically the user interface but is in close proximity to the apparatus. Furthermore any suitable user interface input can be implemented in some embodiments. The user interface can be configured to supply to the spatial audio visualizer 103 inputs for further modifying the mapped display histogram values.

The user interface can be configured to output these values to the spatial audio visualizer 103.

The operation of determining the user interface input can be shown in FIG. 3 by step 205.

The spatial audio visualizer 103 can in some embodiments comprise a display renderer 515. The display renderer 515 can be configured to receive the output of the display mapper 509 and furthermore receive an input from the user interface touch input. The display renderer 515 can be configured in some embodiments to modify the mapped sector display generated by the display mapper 509 based on the user interface touch input.

Figure 8:
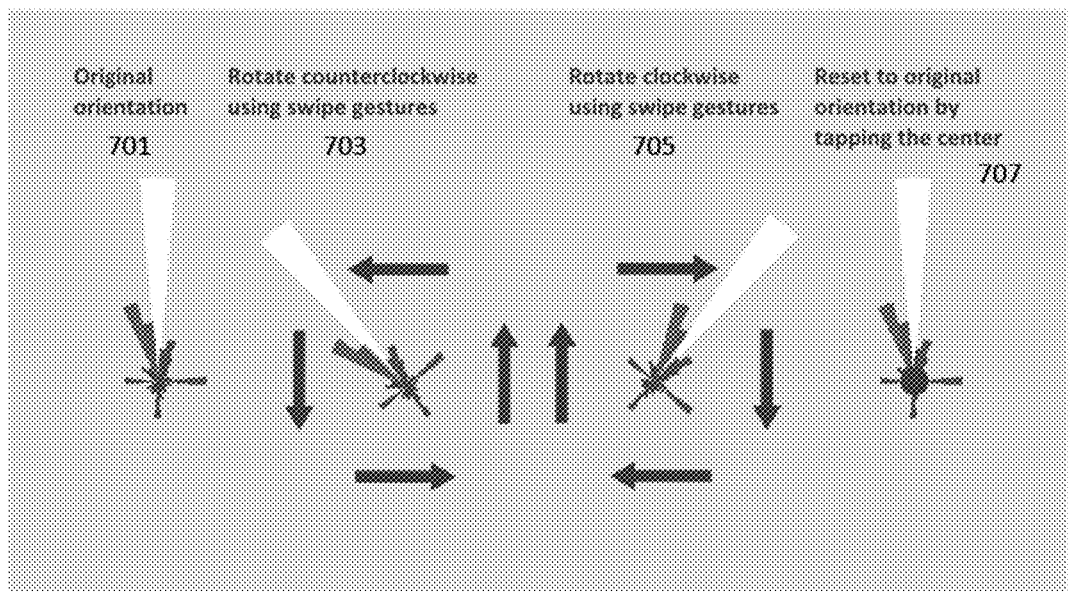
FIG. 8 show example user interface initiated audio visualization display movement operations.

With respect to FIG. 8 an example of the sectorized audio signal visualization 701 of an example mapped display received is shown. In this example both radius and colour variation between sectors are shown with a central large white sector dominating the visualization. Furthermore in some embodiments the audio renderer 106 would be configured to output a rendered audio signal representing the originally generated audio signal.

In some embodiments the spatial audio visualizer 103 and specifically the display renderer 515 can be configured to rotate the visualization in a counter clockwise manner when a user interface touch input is determined to be a 'rotation counter-clockwise' input. A 'rotation counter-clockwise' input can be determined by detecting for example any of the following swipe gestures on the touch input: upwards when detected as being to the right of the displayed visualization, leftwards when detected as being above the displayed visualization, downwards when detected as being to the left of the displayed visualization, and rightwards when detected as being underneath the displayed visualization.

The rotation counter-clockwise operation, and the example 'rotation counter-clockwise' inputs 703 are shown with respect to the original visualization orientation 701 in FIG. 8. Furthermore in such embodiments the audio renderer 106 would be configured to output a rendered audio signal representing the originally generated audio signal having been rotated counter-clockwise in synchronisation or in step with the visualization orientation rotation. This can be generated by the audio renderer 106, having received the 'counter-clockwise' indicator from the user interface, by the application of a changing head related transfer function between the input audio signals and the rendered or output audio signals.

Furthermore in some embodiments the display renderer 515 can be configured to rotate the visualization in a clockwise manner when a user interface touch input is determined to be a 'rotation clockwise' input. A 'rotation clockwise' input can be determined by detecting for example any of the following any of the following swipe gestures on the touch input: downwards when detected as being to the right of the displayed visualization, rightwards when detected as being above the displayed visualization, upwards when detected as being to the left of the displayed visualization, and leftwards when detected as being underneath the displayed visualization.

The rotation clockwise operation where the display renderer 515 rotates the visualization in a clockwise manner when a user interface touch input is determined to be a 'rotation clockwise' input, and the example 'rotation clockwise' inputs 705 are shown with respect to the original visualization orientation 701 in FIG. 8. Furthermore in such embodiments the audio renderer 106 would be configured to output a rendered audio signal representing the originally generated audio signal having been rotated clockwise in synchronisation or in step with the visualization orientation rotation. This can be generated by the audio renderer 106, having received the 'clockwise' indicator from the user interface, by the application of a changing head related transfer function between the input audio signals and the rendered or output audio signals.

In some embodiments the display renderer 515 can be configured to reset the visualization to the original visualization when a user interface touch input is determined to be a 'reset' input. A 'reset' input can be determined by detecting a tap or touch input approximating to the centre of the visualization.

The resetting to the original orientation 707 operation where the display renderer 515 resets the visualization when a user interface touch input is determined to be a 'reset' input is shown in FIG. 8 with respect to the original visualization orientation 701. Furthermore in such embodiments the audio renderer 106 would be configured to output a rendered audio signal representing the reset or originally generated audio signal in synchronisation or in step with the visualization orientation reset. This can be generated by the audio renderer 106, having received the 'reset' indicator from the user interface, by the application of a changing head related transfer function between the input audio signals and the rendered or output audio signals.

The display renderer 515 and the audio renderer 106 can in some embodiments be configured to determine any suitable user interface gesture. In the examples as described above rotation operations could be replaced by tilt (vertical rotate), move (translational motion), zoom (zoom in or out), pan, or rotate about a point other than the apparatus or any other suitable operation.

The display renderer 515 can be configured to output the visualization to a display 105.

The operation of rendering the visualization is shown in FIG. 7 by step 611.

Furthermore the generation of visualization of spatial audio signal depending on the user interface input is shown in FIG. 3 by step 207.

The generation of the audio rendering dependent on the user interface input is further also shown in FIG. 3 by step 209.

The display 105 can be as described herein any suitable display for displaying the audio visualization. In some embodiments the audio visualization as described herein can be overlaid with a captured video associated with the generated audio signal from the spatial microphone arrangement. Thus in some embodiments the display renderer 515 is configured to show a small version of the visualization over the video at one of the corners of the screen. In some embodiments the visualization contains a layer of opacity permitting the video to pass through the visualization of the audio sound field. In some embodiments as the user is able to rotate the sound field the video image is not effected.

In some embodiments the visualization is displayed over the video as vertical bars so that the location of each bar corresponds to the direction in the video. In such embodiments swipe gestures can be used to rotate the sound field but the video is rotated as well. In some embodiments where the video capture is not available for these directions a black screen can be displayed. However, over the black screen the vertical bar sound field visualization is still displayed. In some embodiments, for example where video is captured by a 360° camera the video can be rotated with the audio.

In such embodiments it is possible for a user to view a visual representation of a spatially captured sound which enables the operator to check in which direction the most interesting sound sources are. Furthermore in such embodiments the captured video can be augmented with audio information.

In the description herein the components can be considered to be implementable in some embodiments at least partially as code or routines operating within at least one processor and stored in at least one memory.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

We claim:

1. A method comprising:
   receiving at least two audio signals from one or more sound sources by two or more microphones of an apparatus;
   determining at least one user interface element associated with the one or more sound sources being displayed by a display of the apparatus based on the at least two audio signals, wherein the at least one user interface element is configured to be modified by an indicator;
   determining at least one spatial component of the one or more sound sources comprising at least one directional component;
   generating a visualization of the one or more sound sources, wherein the visualization is configured to rotate or change the at least one directional component of the one or more sound sources dependent on the indicator for the at least one user interface element, the at least one directional component based on the at least two audio signals, wherein generating the visualization further comprises the at least one directional component for the one or more sound sources being mapped to the visualization, wherein the at least one directional component comprises direction and magnitude of the one or more sound sources; and
   rendering the at least two audio signals to generate a modified version of the at least one spatial component of the one or more sound sources after being mapped to the visualization dependent on the indicator, wherein the visualization comprises a rotation direction indication of a swipe gesture for the visualization of the one or more sound sources to cause to rotate said at least one directional component of the modified version of the at least one spatial component during rendering together with said magnitude of the one or more sound sources in such a way that the one or more sound sources is reproduced with the modified version of the at least one spatial component based on the swipe gesture.

2. The method as claimed in claim 1, wherein receiving the at least two audio signals further comprises at least one of:
   receiving the at least two audio signals from the at least two or more microphones of the apparatus;
   receiving the at least two audio signals from a memory; or
   receiving the at least two audio signals from at least one external apparatus.

3. The method as claimed in claim 1, wherein determining the at least one user interface element further comprises:

receiving the at least one user interface element from a touch screen;
determining an action associated with the at least one user interface element; and
outputting the indicator so as to represent the action.

4. The method as claimed in claim 3, wherein generating the visualization of the one or more sound sources further comprises:
receiving the indicator; and
modifying the visualization of the at least two audio signals dependent on the indicator.

5. The method as claimed in claim 3, wherein rendering the at least two audio signals to generate the modified version of the at least one spatial component further comprises:
receiving the indicator; and
modifying the rendered at least two audio signals dependent on the indicator to follow the visualization of the at least two audio signals.

6. The method as claimed in claim 3, wherein the action associated with the at least one user interface element comprises at least one of:
a clockwise rotation;
a counter-clockwise rotation;
a translational motion;
a rotation about an external point;
a focus on a determined position; or
a tilt.

7. The method as claimed in claim 1, wherein generating the visualization of the one or more sound sources further comprises:
determining the at least one directional component of the one or more sound sources; and
determining a radial value for a visualization sector dependent on a frequency of directional components of the at least two audio signals in a sector range.

8. The method as claimed in claim 7, wherein determining the at least one spatial component of the one or more sound sources comprising the at least one directional component further comprises:
grouping time domain samples of the at least two audio signals into frames;
time to frequency domain converting the frames of the at least two audio signals;
dividing the frequency domain representation of the at least two audio signals into at least two sub-bands; and
comparing pairs of audio signal sub-bands to determine the at least one directional component.

9. The method as claimed in claim 7, wherein generating the visualization of the one or more sound sources further comprises:
determining at least one magnitude component for the at least one directional component of the one or more sound sources; and
determining a color value for the visualization sector dependent on the at least one magnitude component for the at least one directional component of the one or more sound sources.

10. An apparatus comprising:
at least one processor and
at least one memory including computer code for one or more programs, the at least one memory and the computer code configured to with the at least one processor cause the apparatus to at least:
receive at least two audio signals from one or more sound sources by two or more microphones of a device;
determine at least one user interface element associated with the one or more sound sources being displayed by a display of the device based on the at least two audio signals, wherein the at least one user interface element is configured to be modified by an indicator;
determine at least one spatial component of the one or more sound sources comprising at least one directional component;
generate a visualization of the one or more sound sources, wherein the visualization is configured to rotate or change the at least one directional component of the one or more sound sources dependent on the indicator for the at least one user interface element, the at least one directional component based on the at least two audio signals, wherein generating the visualization further comprises the at least one directional component for the one or more sound sources being mapped to the visualization, wherein the at least one directional component comprises direction and magnitude of the one or more sound sources; and
render the at least two audio signals to generate a modified version of the at least one spatial component of the one or more sound sources after being mapped to the visualization dependent on the indicator, wherein the visualization comprises a rotation direction indication of a swipe gesture for the visualization of the one or more sound sources to cause to rotate the at least one directional component of the modified version of the at least one spatial component during rendering together with said magnitude of the one or more sound sources in such a way that the one or more sound sources is reproduced with the modified version of the at least one spatial component based on the swipe gesture.

11. The apparatus as claimed in claim 10, wherein the received at least two audio signals further causes the apparatus to at least one of:
receive the at least two audio signals from the at least two or more microphones of the device;
receive the at least two audio signals from a memory; or
receive the at least two audio signals from at least one external apparatus.

12. The apparatus as claimed in claim 10, wherein the determined at least one user interface element further causes the apparatus to:
receive the at least one user interface element from a touch screen;
determine an action associated with the at least one user interface element; and
output the indicator so as to represent the action.

13. The apparatus as claimed in claim 10, wherein the generated visualization of the one or more sound sources further causes the apparatus to:
receive the indicator; and
modify the visualization of the at least two audio signals dependent on the indicator.

14. The apparatus as claimed in claim 10, wherein the rendered at least two audio signals further causes the apparatus to:
receive the indicator; and
modify the rendered at least two audio signals dependent on the indicator to follow the visualization of the at least two audio signals.

15. The apparatus as claimed in claim 10, wherein the action associated with the at least one user interface element comprises at least one of:
a clockwise rotation;
a counter-clockwise rotation;

a translational motion;
a rotation about an external point;
a focus on a determined position; or
a tilt.

16. The apparatus as claimed in claim 10, wherein the generated spatial visualization of the one or more sound sources further causes the apparatus to:
   determine the at least one directional component of the one or more sound sources; and
   determine a radial value for a visualization sector dependent on a frequency of directional components of the at least two audio signals in a sector range.

17. The apparatus as claimed in claim 16, wherein the determined at least one spatial component of the one or more sound sources comprising the at least one directional component further causes the apparatus to:
   group time domain samples of the at least two audio signals into frames;
   time to frequency domain convert the frames of the at least two audio signals;
   divide the frequency domain representation of the at least two audio signals into at least two sub-bands; and
   compare pairs of audio signal sub-bands to determine the at least one directional component.

18. The apparatus as claimed in claim 16, wherein the generated visualization of the one or more sound sources further causes the apparatus to:
   determine at least one magnitude component for the at least one directional component of the one or more sound sources; and
   determine a color value for the visualization sector dependent on the at least one magnitude component for the at least one directional component of the one or more sound sources.

19. The apparatus as claimed in claim 16, wherein the rendered at least two audio signals to generate the modified version of the at least one spatial component causes the apparatus to:
   generate a head related transfer function; and
   apply the head related transfer function to the at least two audio signals.

20. The method as claimed in claim 1, wherein the at least one user interface element further comprises a synchronize timing of the rotation direction indication with a timing of the spatial visualization of the one or more sound sources.

21. The apparatus as claimed in claim 10, wherein the at least one user interface element further comprises a synchronize timing of the rotation direction indication with a timing of the spatial visualization of the one or more sound sources.

22. A computer program product comprising a non-transitory computer readable storage medium, the non-transitory computer readable storage medium comprising program code instructions that, when executed by a processor, configure the processor to:
   receive at least two audio signals from one or more sound sources by two or more microphones of an apparatus;
   determine at least one user interface element associated with the one or more sound sources being displayed by a display of the apparatus based on the at least two audio signals, wherein the at least one user interface element is configured to be modified by an indicator;
   determine at least one spatial component of the one or more sound sources comprising at least one directional component;
   generate a visualization of the one or more sound sources, wherein the visualization is configured to rotate or change the at least one directional component of the one or more sound sources dependent on the indicator for the at least one user interface element, the at least one directional component based on the at least two audio signals, wherein generating the visualization further comprises the at least one directional component for the one or more sound sources being mapped to the visualization, wherein the at least one directional component comprises direction and magnitude of the one or more sound sources; and
   render the at least two audio signals to generate a modified version of the at least one spatial component of the one or more sound sources after being mapped to the visualization dependent on the indicator, wherein the visualization comprises a rotation direction indication of a swipe gesture for the visualization of the one or more sound sources to cause to rotate the at least one directional component of the modified version of the at least one spatial component during rendering together with said magnitude of the one or more sound sources in such a way that the one or more sound sources is reproduced with the modified version of the at least one spatial component based on the swipe gesture.

23. The computer program product as claimed in claim 22, wherein the at least one user interface element further comprises a synchronize timing of the rotation direction indication with a timing of the spatial visualization of the one or more sound sources.

24. The method as claimed in claim 1, wherein the at least one directional component further comprises the direction and the magnitude of the one or more sound sources at each frequency band and time frame of the at least two audio signals.

* * * * *